UNITED STATES PATENT OFFICE.

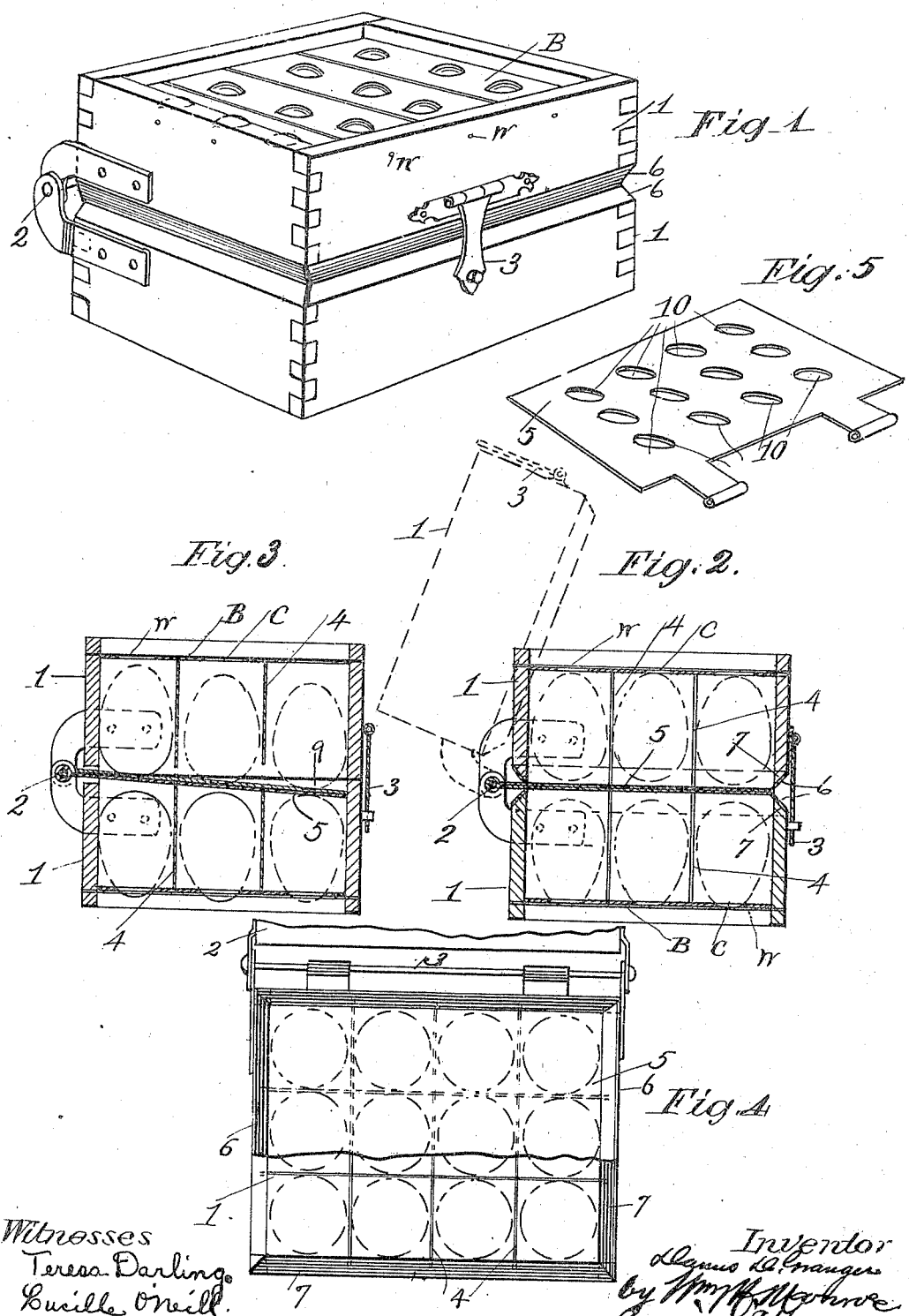

DANUS D. GRANGER, OF NEW LONDON, OHIO.

EGG-TRAY.

947,813.  Specification of Letters Patent.  Patented Feb. 1, 1910.

Application filed March 31, 1909. Serial No. 487,034.

*To all whom it may concern:*

Be it known that I, DANUS D. GRANGER, a citizen of the United States, and resident of New London, in the county of Huron and State of Ohio, have invented certain new and useful Improvements in Egg-Trays, of which I hereby declare the following to be a full, clear, and exact description, such as will enable others skilled in the art to which it appertains to make and use the same.

The objects of the invention are to provide an egg crate or package in folding or hinged portions so designed that one portion shall serve the purpose of a cover for the other portion, and both portions shall serve as receptacles for the eggs, and form together a convenient, simple and attractive means for conveying eggs.

On account of the brittleness of their shells the eggs are confined in separate pockets in each portion of the crate, and to make their delivery from their several pockets easily accomplished without handling them and therefore without danger of breaking them an intermediate leave or leaves are interposed between the folded sections, upon which the eggs in the upper portion will lie when the upper portion is thrown back upon its hinge. In this manner displaying them, and rendering them easily accessible for handling.

The invention further consists in the combination and arrangement of parts as hereinafter described, shown in the accompanying drawings, and specifically pointed out in the claims.

In the accompanying drawings, Figure 1 is a perspective view of the folding crate; Fig. 2 is a vertical central section therethrough, showing the upper portion or member raised in dotted lines; Fig. 3 is a similar section of a crate having a modified form of intermediate receiving leaf for displaying the eggs when the upper portion or member is raised; Fig. 4 is a plan view of one hinged portion or member; Fig. 5 is a perspective view of a modified form of intermediate leaf provided with openings in which the extreme ends of the eggs can rest and thus prevent them from rolling.

In these views 1, 1 are receptacles for eggs, and together they form the component portions or members of one egg crate, and are hinged together at 2, so as to fold upon each other, a fastening device 3 is employed to retain them together during shipment.

Each member is provided with partitions 4, 4 arranged to form egg pockets adapted to separate their shells from contact with each other and to form practically tight receptacles, so that the eggs can not roll around and in the crate. The partitions should not be loose in the crate members, but must preferably move with them when they are lifted in turn to discharge the eggs.

Intermediate between the crate members and hinged to the common pintle rod 2, is shown the leaf 5, upon which the eggs will fall by gravity from their pockets in whatever crate member happens to be uppermost. So that when that member is raised the eggs from that member will be upon it and can be easily removed therefrom. When the crate is turned over the eggs in the other crate member will fall upon the leaf in the same manner.

Any desired means for temporarily retaining the eggs on the leaf can be employed, so that they will be in no danger of rolling off and becoming broken while the cover portion or member is being raised and still be within the spirit of the invention.

In Figs. 1 and 2 the intermediate leaf or leaves 5, 5, are shown provided with raised flanges 6, 6, exterior to the edges of the crate members. These edges are shown also correspondingly beveled, at 7, 7 to receive the flanges, so that a smooth and attractive appearance is observed, in the case, and the edges of the flanges are flush with outer edges of the crate members. These flanges serve to retain the eggs upon the leaf.

In Fig. 3 the leaf is shown without flanges and inclosed within the box. This leaf will drop a little below the hinge center and rest upon the tops of the partitions. In this manner the edges of the crate members at 9, 9, will extend above the leaf in either member that is down, and form a raised edge to protect the eggs. Under ordinary circumstances this will be sufficient.

A hinged leaf or leaves such as shown in Fig. 5 can be used if desired, provided with small openings 10 in which the eggs can rest in the vertical position. One of the advantages of this device is that the parts are all attached to each other and therefore can be used over and over again, without the renewal of any of the parts. A loose non-attached leaf could however be interposed between the members, without departing from the spirit of the invention.

The bottom B for each crate member is preferably formed of thin material such as card board and provided with openings C in which the eggs rest. The bottom is raised above the lower edge of each member so that there will be no danger of the eggs striking the surface on which the crate stands.

The walls of the crate will isolate them from the support for the crate.

The bottoms are supported and strengthened in the crate members by means of one or more wires W, which pass through the crate walls.

Either one or two intervening leaves 5 can be employed as desired. It is however more convenient to employ two leaves face to face, since the eggs can be more easily held back by two leaves when opening the crate.

Having described the invention what I claim as new and desire to secure by Letters Patent is:

1. In an egg crate, egg receptacle members hinged together and designed to become alternately upper and lower members, a leaf having a common hinge axis therewith, said leaf adapted to support the eggs delivered from said members in turn, when either becomes an upper member and instrumentalities operating in unison with said leaf to retain the eggs thereon, when the upper member is lifted on its hinge.

2. In an egg crate upper and lower crate members hinged together, an intermediate leaf between said members and flanged edges for said leaf, said flanged edges being arranged exterior to the walls of said crate members.

3. In an egg crate, folding crate members, an intermediate leaf, between said members, a common hinge for said leaf and crate members, partitions forming pockets in said crate members, perforated bottoms, spaced from edges of said crate walls, and supporting wires for said bottoms secured in said crate walls substantially as described.

In testimony whereof, I hereunto set my hand this 22nd day of March, 1909.

DANUS D. GRANGER.

In presence of—
 Geo. S. Cole,
 Wm. M. Monroe.